United States Patent
Lee et al.

(10) Patent No.: US 12,352,703 B2
(45) Date of Patent: *Jul. 8, 2025

(54) ELECTRODE QUALITY EVALUATION METHOD AND ELECTRODE MANUFACTURING METHOD

(71) Applicant: LG ENERGY SOLUTION, LTD., Seoul (KR)

(72) Inventors: Hyun Sup Lee, Daejeon (KR); Hyun Jin Yang, Daejeon (KR); Kyun Il Rah, Daejeon (KR); Kyoung Ho Kim, Daejeon (KR); Myung Han Lee, Daejeon (KR); Kyung Mee Lee, Daejeon (KR); Won Seok Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 373 days.

This patent is subject to a terminal disclaimer.

(21) Appl. No.: 17/916,932

(22) PCT Filed: Apr. 1, 2021

(86) PCT No.: PCT/KR2021/004070
§ 371 (c)(1),
(2) Date: Oct. 4, 2022

(87) PCT Pub. No.: WO2021/210818
PCT Pub. Date: Oct. 21, 2021

(65) Prior Publication Data
US 2023/0152214 A1 May 18, 2023

(30) Foreign Application Priority Data

Apr. 13, 2020 (KR) .................. 10-2020-0044899
Sep. 17, 2020 (KR) .................. 10-2020-0119927

(51) Int. Cl.
*G01N 21/95* (2006.01)
*G01N 21/25* (2006.01)
*H01M 4/04* (2006.01)

(52) U.S. Cl.
CPC ........... *G01N 21/95* (2013.01); *G01N 21/251* (2013.01); *H01M 4/0404* (2013.01); *H01M 4/0435* (2013.01)

(58) Field of Classification Search
CPC .. G01N 21/95; G01N 21/251; G01N 21/8422; H01M 4/0404; H01M 4/0435
See application file for complete search history.

(56) References Cited

U.S. PATENT DOCUMENTS

| 8,097,365 B2 * | 1/2012 | Iwama | H01M 6/164 428/209 |
| 9,911,972 B2 * | 3/2018 | Takahata | H01M 4/0416 |
| 11,971,344 B2 * | 4/2024 | Lee | H01M 4/0471 |
| 12,209,805 B2 * | 1/2025 | Kim | H01M 4/0471 |
| 2014/0178766 A1 | 6/2014 | Kato et al. | |
| 2020/0194792 A1 | 6/2020 | Han et al. | |
| 2020/0240915 A1 | 7/2020 | Son et al. | |
| 2023/0127402 A1 * | 4/2023 | Lee | H01M 4/0435 356/402 |

FOREIGN PATENT DOCUMENTS

| CN | 103733399 A | 4/2014 | |
| JP | H09-283123 A | 10/1997 | |
| JP | 2003-004632 A | 1/2003 | |
| JP | 2005-172646 A | 6/2005 | |
| JP | 2008010320 A * | 1/2008 | ........ H01M 10/0525 |
| JP | 2010-102873 A | 5/2010 | |
| JP | 2011100565 A * | 5/2011 | |
| JP | 5318303 B1 | 10/2013 | |
| JP | 2013-239348 A | 11/2013 | |
| JP | 5492528 B2 | 5/2014 | |
| JP | 2020-516021 A | 5/2020 | |
| KR | 10-2010-0089319 A | 8/2010 | |
| KR | 10-2014-0051323 A | 4/2014 | |
| KR | 10-1947565 B1 | 2/2019 | |
| KR | 10-2019-0084470 A | 7/2019 | |
| WO | 2014-118934 A1 | 8/2014 | |

(Continued)

OTHER PUBLICATIONS

Office Action dated Aug. 29, 2024 issued in Chinese Patent Application No. 202180024352.9.

(Continued)

*Primary Examiner* — Octavia Hollington
(74) *Attorney, Agent, or Firm* — Morgan, Lewis & Bockius LLP

(57) ABSTRACT

Provided is a method of evaluating electrode quality capable of simply and quickly filtering out defective electrodes by measuring a color coordinate value of electrodes before roll-pressing, which specifically includes: providing an electrode which includes a current collector and an active material layer formed on the current collector and has not been roll-pressed; measuring a color coordinate value of the active material layer using an optical instrument; and evaluating the electrode as a good product when the measured color coordinate value satisfies a predetermined electrode quality evaluation criterion and as defective when the measured color coordinate value does not satisfy the predetermined electrode quality evaluation criterion.

13 Claims, No Drawings

(56) References Cited

FOREIGN PATENT DOCUMENTS

WO    2016/121687 A1    8/2016

OTHER PUBLICATIONS

Office Action dated Oct. 10, 2023, issue in corresponding Japanese Patent Application No. 2022-560123.
Extended European Search Report issued in corresponding European patent application 21788268.7 dated Dec. 20, 2023.
International Search Report (with partial translation) and Written Opinion dated Jul. 20, 2021, for corresponding International Patent Application No. PCT/KR2021/004070.
Office Action issued on May 14, 2025 in Korean Patent Application No. 10-2020-0119927.

* cited by examiner

ELECTRODE QUALITY EVALUATION METHOD AND ELECTRODE MANUFACTURING METHOD

CROSS-REFERENCE TO RELATED APPLICATION

This application claims priority to and the benefit of Korean Patent Application No. 10-2020-0044899, filed on Apr. 13, 2020, and Korean Patent Application No. 10-2020-0119927, filed on Sep. 17, 2020, the disclosures of which are incorporated herein by reference in their entirety.

TECHNICAL FIELD

Technical Field

The present invention relates to a method of evaluating the quality of an electrode by a simple means of measuring a color coordinate value of the electrode before roll-pressing and a method of manufacturing an electrode including evaluating the quality of the electrode thereby.

Background Art

Adhesion, thickness, and loading amount are some of the commonly known electrode quality inspection items. Among these electrode quality inspection items, adhesion is an item for filtering out electrodes detached in an electrode assembly process, electrodes peeled off in the activation process, and the like, and is a very important quality inspection item.

However, there are problems in that the adhesion of an electrode can only be evaluated after roll-pressing, and electrode quality cannot be evaluated in real time.

Therefore, there is a need to develop a method capable of evaluating electrode quality by evaluating properties before roll-pressing.

DISCLOSURE

Technical Problem

The present invention is directed to providing a method of evaluating electrode quality which is capable of filtering out defective electrodes before roll-pressing by the simple means of measuring a color coordinate value of electrodes before roll-pressing.

Technical Solution

One aspect of the present invention provides a method of evaluating electrode quality capable of simply and quickly filtering out defective electrodes by measuring a color coordinate value of electrodes before roll-pressing, which specifically includes: providing an electrode which includes a current collector and an active material layer formed on the current collector and has not been roll-pressed; measuring a color coordinate value of the active material layer using an optical instrument; and evaluating the electrode as a good product when the measured color coordinate value satisfies a predetermined electrode quality evaluation criterion and as defective when the measured color coordinate value does not satisfy the predetermined electrode quality evaluation criterion.

Another aspect of the present invention includes a method of manufacturing an electrode, which includes: forming an active material layer by applying a slurry including an active material, a conductive material, and a binder onto a current collector and drying, and thus manufacturing an electrode which has not been roll-pressed; evaluating the quality of the electrode by the above-described method; and roll-pressing an electrode evaluated as a good product.

Advantageous Effects

A method of evaluating electrode quality according to the present invention is capable of simply and quickly filtering out defective electrodes by measuring a color coordinate value of electrodes before roll-pressing. That is, it is possible to filter out defective electrodes even before roll-pressing, and therefore, it is possible to significantly reduce a defect rate of finished electrode products.

In addition, according to the present invention, it is possible to predict adhesion, which is a property attained after roll-pressing, by the simple means of measuring a color coordinate value before roll-pressing.

Best Mode of the Invention

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

It will be understood that terms such as "comprises," "comprising," "includes," "including," "has" or "having," when used in the present specification, specify the presence of stated features, numbers, steps, components, or combinations thereof and do not preclude the possibility of the presence or addition of one or more other features, numbers, steps, components, or combinations thereof.

Hereinafter, the present invention will be described in detail.

<Method of Evaluating Electrode Quality>

A method of evaluating electrode quality according to the present invention is an electrode quality evaluation method capable of simply and quickly filtering out defective electrodes by measuring a color coordinate value of an electrode before roll-pressing, and the method specifically includes: providing an electrode which includes a current collector and an active material layer formed on the current collector and has not been roll-pressed; measuring a color coordinate value of the active material layer using an optical instrument; and evaluating the electrode as a good product when the measured color coordinate value satisfies a predetermined electrode quality evaluation criterion and as defective when the measured color coordinate value does not satisfy the predetermined electrode quality evaluation criterion.

When a color coordinate value of an active material layer of an electrode which has not been roll-pressed is measured using the optical instrument as described above and satisfies a predetermined electrode quality evaluation criterion, after the electrode is roll-pressed, since the adhesion between a current collector and an active material layer is excellent, an adhesion defect may not occur. For example, when an electrode classified as a good product according to the present invention is roll-pressed, an adhesive strength of 40 gf/20 mm or more can be secured between a current collector and an active material layer of the electrode.

According to the present invention, it is possible to predict adhesion, which is a property attained after roll-pressing, by the simple means of measuring a color coordinate value before roll-pressing and filter out defective electrodes before roll-pressing. That is, it is possible to filter out defective electrodes even before roll-pressing, and therefore, it is possible to significantly reduce a defect rate of finished electrode products.

Hereinafter, each step of the method of evaluating electrode quality according to the present invention will be described in more detail.

Provision of Electrode Which Has Not Been Roll-Pressed

The present invention includes a step of providing an electrode which includes a current collector and an active material layer formed on the current collector and has not been roll-pressed.

The present invention does not evaluate electrodes that have been roll-pressed as in conventional electrode quality evaluation but evaluates the quality of battery electrodes that have not been roll-pressed, so defective electrodes can be filtered out before roll-pressing, and a defect rate after roll-pressing can be significantly reduced.

Measurement of Color Coordinate Value of Active Material Layer of Electrode

The present invention includes a step of measuring a color coordinate value of the active material layer using an optical instrument.

The optical instrument is an instrument including a light source and an image sensor, and when an active material layer of each of the electrodes is analyzed using the optical instrument, color information from the surface of the active material layer of each of the electrodes is converted into color coordinate values and detected. The image sensor is a device capable of converting incoming light into an electrical signal and may be, for example, a charge coupled device (CCD) sensor or a complementary metal-oxide-semiconductor (CMOS) sensor.

According to the present invention, the optical instrument may be a spectrophotometer or a colorimeter.

The color coordinate value collectively refers to numerical values expressed as coordinates in a three-dimensional color space, and, for example, the color coordinate value may be an L* value, an a* value, or a whiteness value.

According to the present invention, the color coordinate value of an active material layer may be measured by a contact colorimeter or a non-contact colorimeter. That is, the colorimeter may be a contact colorimeter or a non-contact colorimeter. In the case of using a non-contact colorimeter, since measurement is possible without direct contact with a sample, measurement is convenient, and measurement can be performed in a continuous manufacturing process.

The color coordinate value of an active material layer may be measured, for example, using a CM2600d colorimeter manufactured by Konica Minolta, Inc. Specifically, the color coordinate value may be measured using a CM2600d colorimeter manufactured by Konica Minolta, Inc., by setting the measurement mode to Specular Component Included (SCI) or Specular Component Excluded (SCE) and selecting a D65 standard light source (color temperature: 6,500 K) and the CIE 1976 10° standard observer, performing white correction, and then bringing the colorimeter into contact with a location to be measured.

Evaluation of Electrode as Good or Defective Through Comparison of Measured Color Coordinate value with Predetermined Electrode Quality Evaluation Criterion The present invention includes a step of evaluating the electrode as a good product when the measured color coordinate value satisfies a predetermined electrode quality evaluation criterion and as defective when the measured color coordinate value does not satisfy the predetermined electrode quality evaluation criterion.

When the measured color coordinate value satisfies the predetermined electrode quality evaluation criterion, since excellent adhesion between a current collector and an active material layer can be secured after roll-pressing, a defect rate of an electrode which has been roll-pressed can be significantly reduced.

According to the present invention, when the color coordinate value is an L* value, the predetermined electrode quality evaluation criterion for the L* value may be 35.4 or more and preferably 35.4 or more and 40 or less.

According to the present invention, when the color coordinate value is an a* value, the predetermined electrode quality evaluation criterion for the a* value may be 0.78 or more and preferably 0.78 or more and 0.96 or less.

According to the present invention, when the color coordinate value is a whiteness value, the predetermined electrode quality evaluation criterion for the whiteness value may be 7 or more and preferably 7 or more and 9 or less.

This is because only when the L*, a*, and whiteness values satisfy the predetermined electrode quality evaluation criteria ranges described above, can excellent adhesion between a current collector and an active material layer be secured after roll-pressing, and thus a defect rate of finished electrode products be significantly reduced.

An electrode which is classified as a good product as a result of the above-described comparison because the measured color coordinate value satisfies the predetermined electrode evaluation criterion may have excellent electrode quality after roll-pressing. Specifically, an electrode classified as a good product according to the electrode quality evaluation method of the present invention may exhibit excellent adhesion between a current collector and an active material layer after roll-pressing. For example, an adhesive strength of 40 gf/20 mm or more can be secured between a current collector and an active material layer.

<Method of Manufacturing Electrode>

A method of manufacturing an electrode according to the present invention includes: forming an active material layer by applying a slurry including an active material, a conductive material, and a binder onto a current collector and drying, and thus manufacturing an electrode which has not been roll-pressed; evaluating the quality of the electrode by the above-described method; and roll-pressing an electrode evaluated as a good product.

Hereinafter, each step of the method of manufacturing an electrode according to the present invention will be described in more detail.

Manufacture of Electrode Which Has Not Been Roll-Pressed

The present invention includes a step of forming an active material layer by applying a slurry including an active material, a conductive material, and a binder onto a current collector and drying, and thus manufacturing an electrode which has not been roll-pressed. The active material layer may be formed on one or both sides of the current collector.

The current collector is not particularly limited as long as it does not cause a chemical change in a battery and has conductivity, and in the case of a positive electrode current collector, for example, stainless steel, aluminum, nickel, titanium, calcined carbon, aluminum or stainless steel whose surface has been treated with carbon, nickel, titanium, silver, or the like may be used, and in the case of a negative electrode current collector, for example, copper, stainless steel, aluminum, nickel, titanium, calcined carbon, copper or stainless steel whose surface has been treated with carbon, nickel, titanium, silver, or the like, an aluminum-cadmium alloy, or the like may be used.

The current collector may typically have a thickness of 3 µm to 500 µm and may have fine irregularities formed in a surface thereof to increase the adhesion of a positive electrode material or a negative electrode material. For example, the current collector may be used in any of various forms such as a film, a sheet, a foil, a net, a porous material, a foam, a non-woven fabric, and the like.

The slurry may be prepared by dissolving or dispersing an active material, a conductive material, and a binder in a solvent.

When the active material is a positive electrode active material, the positive electrode active material is a compound enabling the reversible intercalation and deintercalation of lithium and, specifically, may include a lithium composite metal oxide including lithium and one or more transition metals such as cobalt, manganese, nickel, or aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ ($0<Y<1$), $LiMn_{2-z}Ni_zO_4$ ($0<Z<2$)), a lithium-nickel-cobalt-based oxide (e.g., $LiNi_{1-Y1}Co_{Y1}O_2$ ($0<Y1<1$)), a lithium-manganese-cobalt-based oxide (e.g., $LiCo_{1-Y2}Mn_{Y2}O_2$ ($0<Y2<1$), $LiMn_{2-Z1}Co_{Z1}O_4$ ($0<Z1<2$)), a lithium-nickel-manganese-cobalt-based oxide (e.g., $Li(Ni_pCo_qMn_{r1})O_2$ ($0<p<1$, $0<q<1$, $0<r1<1$, and $p+q+r1=1$), $Li(Ni_{p1}Co_{q1}Mn_{r2})O_4$ ($0<p1<2$, $0<q1<2$, $0<r2<2$, and $p1+q1+r2=2$)), or a lithium-nickel-cobalt-transition metal (M) oxide (e.g., $Li(Ni_{p2}Co_{q2}Mn_{r3}Ms_2)O_2$ (M is selected from the group consisting of Al, Fe, V, Cr, Ti, Ta, Mg and Mo, and p2, q2, r3 and s2 represent an atomic fraction of each independent element, and satisfy $0<p2<1$, $0<q2<1$, $0<r3<1$, $0<s2<1$, and $p2+q2+r3+s2=1$)), and these compounds may be used alone or in combination of two or more thereof.

When the active material is a negative electrode active material, various negative electrode active materials used in the art, for example, a carbon-based negative electrode active material, a silicon-based negative electrode active material, a metal alloy, and the like may be used as the negative electrode active material.

As the carbon-based negative electrode active material, various carbon-based negative electrode active materials used in the art, for example, graphite-based materials such as natural graphite, artificial graphite, and Kish graphite, pyrolytic carbon, mesophase pitch-based carbon fiber, mesocarbon microbeads, mesophase pitches, high-temperature calcined carbon such as petroleum or coal tar pitch-derived cokes, soft carbon, hard carbon, and the like may be used. The shape of the carbon-based negative electrode active material is not particularly limited, and materials having various shapes, such as amorphous materials, platy materials, scaly materials, spherical materials, or fibrous materials, may be used.

The silicon-based negative electrode active material may include one or more selected from the group consisting of metal silicon (Si), silicon oxide ($SiO_x$, here, $0<x<2$), silicon carbide (SiC), and a Si—Y alloy (here, Y is an element selected from the group consisting of an alkali metal, an alkaline earth metal, a Group 13 element, a Group 14 element, a transition metal, a rare earth element, and a combination thereof and is not Si). The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The active material may be included in an amount of 80% by weight to 99% by weight, more specifically 80% by weight to 98% by weight or 85% by weight to 98% by weight, based on the total weight of the active material layer. When the content of the active material is within the above range, excellent capacity characteristics and electrochemical characteristics can be obtained.

The conductive material is used for imparting conductivity to an electrode and can be used without particular limitation as long as it does not cause a chemical change in a battery being manufactured and has electron conductivity. Specific examples thereof include: graphite such as natural graphite or artificial graphite; carbon black such as acetylene black, Ketjen black, channel black, furnace black, lamp black, or thermal black; a carbon-based material such as a carbon fiber; a metal powder or metal fiber such as copper, nickel, aluminum, or silver; a conductive whisker such as zinc oxide or potassium titanate; a conductive metal oxide such as titanium oxide; and a conductive polymer such as a polyphenylene derivative, which may be used alone or in a combination of two or more thereof.

The conductive material may be included in an amount of 0.5% by weight to 30% by weight, more specifically 0.5% by weight to 15% by weight or 0.5% by weight to 10% by weight, based on the total weight of the positive electrode active material layer.

The binder serves to improve adhesion between the active material particles and between the active material and the current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, styrene-butadiene rubber (SBR), fluororubber, or various copolymers thereof, which may be used alone or in a combination of two or more thereof.

The binder may be included in an amount of 0.5% by weight to 30% by weight, more specifically 0.5% by weight to 15% by weight or 0.5% by weight to 10% by weight, based on the total weight of the positive electrode active material layer.

The solvent may be a solvent commonly used in the art, for example, dimethyl sulfoxide (DMSO), isopropyl alcohol, N-methylpyrrolidone (NMP), acetone, water, or the like, and these may be used alone or in a combination of two or more thereof. The usage amount of the solvent is not particularly limited and is sufficient if the viscosity of the slurry can be adjusted to an appropriate level in consideration of the coating thickness, production yield, and workability of the slurry, and the like.

According to the present invention, an active material layer may be formed by applying a slurry including an active material, a conductive material, and a binder onto a current collector in a loading amount of 0.005 $g/cm^2$ to 0.050 $g/cm^2$ and drying the same. The loading amount of the slurry is preferably 0.005 $g/cm^2$ to 0.030 $g/cm^2$ and more preferably 0.005 $g/cm^2$ to 0.025 $g/cm^2$. When the loading amount of the slurry is within the above range, since an active material layer having an appropriate thickness is formed, a defect does not occur in an electrode, and the quality of the electrode can be excellent.

According to the present invention, a total heat amount required for the drying may satisfy the following Equations 1 to 3.

Total heat amount required for drying (kW)=(46.30−L* value)/0.0077  [Equation 1]

In Equation 1,
the L* value is a predetermined electrode quality evaluation criterion and is 35.4 or more.

Total heat amount required for drying (kW)=(1.09−a* value)/2.19×10$^{-5}$  [Equation 2]

In Equation 2,
the a* value is a predetermined electrode quality evaluation criterion and is 0.78 or more.

Total heat amount required for drying (kW)=(13.06−whiteness value)/0.0041  [Equation 3]

In Equation 3,
the whiteness value is a predetermined electrode quality evaluation criterion and is 7 or more.

The present inventors derived Equations 4 to 6 for describing the relationships of an L* value, an a* value, and a whiteness value measured using an optical instrument with adhesive strength and, accordingly, derived the ranges of the L* value, the a* value, and the whiteness value in which an adhesion defect does not occur.

L* value=(Adhesive strength in electrode before roll-pressing+464.40)/14.24  [Equation 4]

a* value=(Adhesive strength in electrode before roll-pressing+319.02)/462.87  [Equation 5]

Whiteness value=(Adhesive strength in electrode before roll-pressing+143.97)/25.27  [Equation 6]

In Equations 4 to 6,
the above-described adhesive strength is an adhesive strength in an electrode before roll-pressing and is measured by attaching the electrode, which has not been roll-pressed, to a glass slide using double-sided tape and pulling the electrode at an angle of 90° at a speed of 100 mm/min using a universal testing machine UTM (manufactured by Lloyd), and measuring a force required to peel off the electrode from the glass slide.

The adhesive strength is 40 gf/20 mm or more.

In addition, the present inventors derived Equations 1 to 3 for describing the relationships of an L* value, an a* value, and a whiteness value with a total heat amount required for drying and, accordingly, derived a drying condition in which an adhesion defect does not occur in an electrode. When a total heat amount required for drying satisfies the above Equations 1 to 3, since a defect does not occur in an electrode, the quality of the electrode can be excellent.

According to the present invention, the drying may be carried out with a total heat amount of 1,000 kW to 1,450 kW. The drying is preferably carried out with a total heat amount of 1,100 kW to 1,400 kW. When the drying is carried out with a total heat amount satisfying the above range, since the drying is achieved to the extent that a defect is not caused in electrodes, the quality of the electrodes can be excellent.

According to the present invention, the active material layer may have a thickness of 50 μm to 500 μm. The thickness of the active material layer is preferably 50 μm to 250 μm. When the thickness of the active material layer is within the above range, the performance of the active material layer can be maximized, and at the same time, the defect rate of an electrode can be significantly reduced.

Evaluation of Electrode Quality

The method of manufacturing an electrode according to the present invention includes a step of evaluating the quality of the electrode by the above-described method.

That is, the method includes a step of measuring a color coordinate value of an active material layer of the manufactured electrode using an optical instrument, and evaluating the electrode as a good product when the measured color coordinate value satisfies a predetermined electrode quality evaluation criterion and as defective when the measured color coordinate value does not satisfy the predetermined electrode quality evaluation criterion. Details of this step are the same as described above.

Roll-Pressing of Electrodes Evaluated as Good Products

The present invention includes a step of roll-pressing an electrode evaluated as a good product and thus forming an electrode.

As described above, an electrode evaluated as a good product according to the electrode quality evaluation method of the present invention can be used for manufacturing a lithium secondary battery after roll-pressing, and in this case, the defect rate of the lithium secondary battery may be significantly low.

The lithium secondary battery can be usefully applied to portable devices such as mobile phones, laptop computers, and digital cameras and electric cars such as hybrid electric vehicles (HEVs).

MODES OF THE INVENTION

Hereinafter, exemplary embodiments of the present invention will be described in detail so that those of ordinary skill in the art can easily implement the present invention. However, the present invention can be implemented in various different forms and is not limited to the embodiments described herein.

Preparation Example 1

A slurry was prepared by adding, to 55 parts by weight of water, 41 parts by weight of natural graphite, 0.5 parts by weight of a conductive material, 2.5 parts by weight of SBR, and 1 part by weight of CMC.

In order to manufacture an electrode, an active material layer having a thickness of 144 μm was formed by applying the slurry at a loading amount of 0.014 g/cm$^2$ on one side of a copper current collector having a thickness of 8 μm and drying the same with a total heat amount of 1,190 kW. An active material layer was formed on the other side of the current collector under the same recipe and process conditions, and thus an electrode including active material layers formed on both sides of the copper current collector and having a total active material layer thickness of 288 μm was obtained.

Preparation Example 2

An electrode was manufactured in the same manner as in Preparation Example 1 except that drying was performed with a total heat amount of 1,257 kW for the manufacture of the electrode.

Preparation Example 3

An electrode was manufactured in the same manner as in Preparation Example 1 except that drying was performed with a total heat amount of 1,396 kW for the manufacture of the electrode.

Preparation Example 4

An electrode was manufactured in the same manner as in Preparation Example 1 except that drying was performed with a total heat amount of 1,480 kW for the manufacture of the electrode.

Example: Evaluation of Electrode Quality

Color coordinate values such as an L* value, an a* value, and a whiteness value were measured from an active material layer of each of the electrodes manufactured in Preparation Examples 1 to 4 using a CM2600d colorimeter manufactured by Konica Minolta, Inc, by setting the measurement mode to SCI and selecting a D65 standard light source (color temperature: 6,500 K) and the CIE 1976 10° standard observer, performing white correction, and then bringing the colorimeter into contact with a location to be measured, and the results are shown in the following Table 1.

TABLE 1

|  | L* | a* | Whiteness |
|---|---|---|---|
| Preparation Example 1 | 37.35 | 0.84 | 8.32 |
| Preparation Example 2 | 36.37 | 0.79 | 7.76 |
| Preparation Example 3 | 35.86 | 0.78 | 7.66 |
| Preparation Example 4 | 34.85 | 0.77 | 6.93 |

When a color coordinate value of an active material layer of each of the electrodes manufactured in Preparation Examples 1 to 4 was compared with a predetermined electrode quality evaluation criterion (L* value: 35.4 or more, a* value: 0.78 or more, whiteness: 7 or more), in the case of the electrodes of Preparation Examples 1 to 3, since all of the measured color coordinates (an L* value, an a* value, and whiteness) satisfied predetermined electrode quality evaluation criteria, the electrodes were evaluated as good products.

On the other hand, in the case of the electrode of Preparation Example 4, since all of the measured color coordinates (an L* value, an a* value, and whiteness) did not satisfy predetermined electrode quality evaluation criteria, the electrode was evaluated as defective.

Experimental Example: Measurement of Adhesion In Electrode Before Roll-Pressing Each of the electrodes manufactured in Preparation Examples 1 to 4 was attached to a glass slide using double-sided tape, and subsequently, the electrode was pulled at an angle of 90° at a speed of 100 mm/min using a UTM (manufactured by Lloyd), and a force required to peel off the electrode from the glass slide was measured. The results are shown in the following Table 2.

TABLE 2

| Used electrode | Adhesive strength before roll-pressing (gf/20 mm) | Adhesive strength after roll-pressing (gf/20 mm) | Evaluation |
|---|---|---|---|
| Preparation Example 1 | 69.3 | 68.5 | Normal |
| Preparation Example 2 | 52.0 | 51.1 | Normal |
| Preparation Example 3 | 44.3 | 44.0 | Normal |
| Preparation Example 4 | 33.8 | 32.9 | Adhesion defect |

As shown in Table 2, in the case of the electrodes of Preparation Example 1 to 3, which were classified as good products according to the electrode quality evaluation method of the present invention, it can be seen that an excellent adhesive strength of 40 gf/20 mm or more was exhibited in the electrodes after roll-pressing.

On the other hand, in the case of the electrode of Preparation Example 4, in which all of the measured color coordinates, an L* value, an a* value, and whiteness, did not satisfy predetermined electrode quality evaluation criteria, it can be seen that the electrode did not have satisfactory properties to be used as an electrode, due to having an adhesive strength of 32.9 gf/20 mm after roll-pressing. That is, it can be seen that adhesion is poor.

Therefore, according to the present invention, it can be seen that it is possible to predict adhesion, which is a property attained after roll-pressing, by the simple means of measuring a color coordinate value before roll-pressing and filter out defective electrodes before roll-pressing. That is, it can be seen that it is possible to filter out defective electrodes even before roll-pressing, and therefore, it is possible to significantly reduce a defect rate of finished electrode products.

The invention claimed is:

1. A method of evaluating quality of an electrode comprising a current collector and an active material and not being rolled, comprising:
   measuring a color coordinate value of the active material layer using an optical instrument; and
   evaluating the quality of the electrode as a good product when the color coordinate value satisfies a predetermined electrode quality evaluation criterion and as defective when the color coordinate value does not satisfy the predetermined electrode quality evaluation criterion.

2. The method of claim 1, wherein the color coordinate value is an L* value, and the predetermined electrode quality evaluation criterion for the L* value is 35.4 or more.

3. The method of claim 1, wherein the color coordinate value is an a value, and the predetermined electrode quality evaluation criterion for the a* value is 0.78 or more.

4. The method of claim 1, wherein the color coordinate value is a whiteness value, and the predetermined electrode quality evaluation criterion for the whiteness value is 7 or more.

5. The method of claim 1, wherein the optical instrument is a spectrophotometer or a colorimeter.

6. The method of claim 5, wherein the colorimeter is a contact colorimeter or a non-contact colorimeter.

7. A method of manufacturing an electrode, comprising:
   forming an active material layer by applying a slurry including an active material, a conductive material, and a binder onto a current collector;

drying the active material layer to manufacture an electrode which is not roll-pressed;
evaluating a quality of the electrode by the method of claim 1; and
roll-pressing the electrode which are evaluated as a good product.

8. The method of claim 7, wherein the slurry is applied in a loading amount of 0.005 g/cm$^2$ to 0.050 g/cm$^2$.

9. The method of claim 7, wherein a total heat amount required for the drying satisfies Equation 1:

Total heat amount required for the drying (kW)= (46.30−$L^*$ value)/0.0077,   Equation 1 wherein, in Equation 1, $L^*$ value is a predetermined electrode quality evaluation criterion and is 35.4 or more.

10. The method of claim 7, wherein a total heat amount required for the drying satisfies Equation 2:

Total heat amount required for the drying (kW)= (1.09−$a^*$ value)/2.19×10$^{-5}$,   Equation 2 wherein, in Equation 2, the a value is a predetermined electrode quality evaluation criterion and is 0.78 or more.

11. The method of claim 7, wherein a total heat amount required for the drying satisfies Equation 3:

Total heat amount required for the drying (KW)= (13.06−whiteness value)/0.0041,   Equation 3 wherein, in Equation 3, the whiteness value is a predetermined electrode quality evaluation criterion and is 7 or more.

12. The method of claim 7, wherein the drying is carried out with a total heat amount of 1,000 kW to 1,450 kW.

13. The method of claim 7, wherein the active material layer has a thickness of 50 μm to 500 μm.

* * * * *